(12) United States Patent
Hirooka et al.

(10) Patent No.: US 8,830,338 B2
(45) Date of Patent: Sep. 9, 2014

(54) IMAGING DEVICE

(75) Inventors: Shinichiro Hirooka, Fujisawa (JP);
Hirotomo Sai, Yokohama (JP); Mari Ohbuchi, Yokohama (JP)

(73) Assignee: Hitachi Ltd, Tokyo (JP)

(*) Notice: Subject to any disclaimer, the term of this patent is extended or adjusted under 35 U.S.C. 154(b) by 125 days.

(21) Appl. No.: 13/570,447

(22) Filed: Aug. 9, 2012

(65) Prior Publication Data

US 2013/0120615 A1   May 16, 2013

(30) Foreign Application Priority Data

Nov. 11, 2011   (JP) .................................. 2011-247026

(51) Int. Cl.
*H04N 5/225* (2006.01)
*H04N 5/232* (2006.01)
*H04N 5/235* (2006.01)

(52) U.S. Cl.
CPC ........... *H04N 5/2356* (2013.01); *H04N 5/2355* (2013.01)
USPC ........................................ 348/218.1; 348/345

(58) Field of Classification Search
CPC . H04N 5/23212; H04N 5/235; H04N 5/2351; H04N 5/2352; H04N 5/2355; H04N 5/2356; H04N 5/351; H04N 5/355; H04N 5/35536; H04N 5/35572; H04N 5/35581
USPC ....................... 348/218.1, 345, 349, 362–364
See application file for complete search history.

(56) References Cited

U.S. PATENT DOCUMENTS

| 6,184,931 B1* | 2/2001 | Kaneda ......................... 348/345 |
| 2002/0180881 A1* | 12/2002 | Kondoh et al. ............... 348/345 |
| 2004/0056966 A1* | 3/2004 | Schechner et al. .......... 348/229.1 |
| 2009/0244301 A1* | 10/2009 | Border et al. ............ 348/208.99 |
| 2012/0105612 A1* | 5/2012 | Yoshino .......................... 348/65 |
| 2014/0002693 A1* | 1/2014 | Nestares et al. ............. 348/239 |

FOREIGN PATENT DOCUMENTS

| JP | 2002-323649 | 11/2002 |
| WO | WO 03/102636 A1 | 12/2003 |

* cited by examiner

*Primary Examiner* — Timothy J Henn
(74) *Attorney, Agent, or Firm* — Antonelli, Terry, Stout & Kraus, LLP.

(57) ABSTRACT

In an imaging device with a wide dynamic range function by combining images, focus is controlled to establish an in-focus state for each image to enlarge the dynamic range with reducing blur, thereby improving visibility. The device includes an imaging unit with a variable focal distance focus lens, an exposure controller for controlling the imaging unit's exposure to implement several shooting operations for a subject with different sensitivity, a processing unit for processing a signal outputted from the imaging unit to generate an image signal and a focus evaluation value indicating focus degree, an image combining unit for combining signals generated by the processing unit and outputting the combined signal, the processing unit generates a focus evaluation value for each outputted signal and the focus controller controls the focus lens for shooting operations of the imaging unit with mutually different sensitivity values, based on focus evaluation values respectively associated therewith.

8 Claims, 8 Drawing Sheets

IMAGING DEVICE

INCORPORATION BY REFERENCE

The present application claims priority from Japanese application JP2011-247026 filed on Nov. 11, 2011, the content of which is hereby incorporated by reference into this application.

BACKGROUND OF THE INVENTION

The present invention relates to an imaging device including an autofocus function to control a focus lens to automatically set the lens to an appropriate in-focus position and a wide dynamic range function to enable a shooting operation of a scene having a wide dynamic range.

A technique of the conventional art in the field related to the present invention has been described in, for example, JP-A-2002-323649. According to the technique, a problem resides in that to create a wide dynamic range image by combining with each other a plurality of screens obtained by shooting one subject under a plurality of exposure conditions, autofocus control is conducted for the subject in various luminance areas. To solve the problem, by disposing a focus voltage selection unit to selectively output, as focus voltages to be referred to by an autofocus control unit, a plurality of focus voltages detected in a plurality of images associated with different exposure conditions, autofocus control is possible for various subjects shot at an appropriate signal level in the respective images shot under different exposure conditions. By further disposing a unit to normalize a plurality of focus voltages, influence of a change in the exposure condition upon the focus voltage is removed, to thereby make it possible to conduct autofocus control independent of the exposure condition.

Further, WO03/102636 describes a technique in which to provide a variable focus lens operating at a frame rate of a high-speed visual system and a control device of the variable focus lens, there is provided a variable focus lens 10 including a container 11 filled with liquid. The container 11 includes a pressure transmission section 15 which makes contact with an actuator 14 to transmit vibration thereof to an associated section and two light transmission sections 12 and 12 on a light incidence surface and a light emission surface. On at least one of the light incidence and emission surfaces, there is disposed a surface section capable of changing in the optical axis direction in the form of projections and depressions in response to a change supplied via the liquid from the pressure transmission section 15. The surface section has an area of s and the pressure transmission section 15 has an area of S, and the ratio therebetween (s/S) is equal to or less than a predetermined value. In response to a change in the actuator 14, the surface section changes, to thereby change the focal length or distance.

SUMMARY OF THE INVENTION

In an operation to shoot a subject in a scene by a digital video camera or a still camera, if quite a large difference exists in brightness between a dark part and a bright part of the scene, the quantity of light received from a part of the scene by a sensor is insufficient and a black image is obtained for the part. Or, the quantity of light received by a sensor is saturated and a white image is obtained for the part. To solve this problem, there exists a dynamic range method in which by changing the exposure condition, a high-sensitivity image is created through a high-sensitivity shooting operation for a subject with low illuminance and a low-sensitivity image is created through a low-sensitivity shooting operation for a subject with high illuminance such that the high-sensitivity and low-sensitivity images are combined with each other at a predetermined ratio, to thereby produce an image having a wide dynamic range. For example, an appropriate wide dynamic range shooting operation is possible by conducting exposure control for the high-sensitivity shooting operation and exposure control for the low-sensitivity shooting operation based on luminance distribution information obtained from respective image signals by an optical detector circuit.

In this connection, in a camera including an autofocus function to automatically detect an optimal focal length to establish an in-focus state, since the primary subject varies between the images to be combined with each other, how to establish the in-focus state is quite important. For example, according to JP-A-2002-323649, focus voltages as evaluation values each indicating a degree of focus or a degree of in-focus state are respectively obtained for a plurality of images to be combined with each other, to thereby control the position of the focus lens to establish the in-focus state for the image with a higher focus voltage. As above, in the existing methods, it is a general practice that the in-focus state is established only for either one of the plural images.

Therefore, for example, in a situation in which it is desired to shoot by a camera a person near the camera in a dark room and a person apart from the camera in a bright outdoor environment at the same time, even when the user desires to view a subject with low illuminance and a subject with high illuminance, if these subjects are largely different in the distance to the camera from each other, only either one of the subjects is set to an in-focus state. Hence, the remaining one thereof is out of focus, and this disadvantageously lowers visibility of the subject.

On the other hand, a focus lens which can be set to an in-focus state at quite a high speed has been recently developed and is being put to practical use. An example is a liquid lens according to WO03/102636 in which the refractive index of the liquid is employed for the focusing operation. It is not required to use a motor to drive the lens in the focusing operation. Hence, even when a shooting operation is conducted a plurality of times during a short period of time, the focusing operation can be appropriately carried out in association with the respective shooting operations.

It is therefore an object of the present invention, which has been devised to solve the problem, to provide an imaging device with an expandable dynamic range capable of creating a combined image less blurred in the overall image, to thereby increase visibility of the image and recognizability for image recognition.

An outline of representative aspects of the present invention described in this specification is as below.

(1) An imaging device, including an imaging unit including a focus lens having a variable focal distance, an exposure controller for controlling exposure of the imaging unit, a focus controller for controlling the focus lens for a plurality of shooting operations by the imaging unit with different sensitivity values under control of the exposure controller, to thereby obtain a predetermined focal distance for each of the sensitivity values; a signal processing unit for processing a signal obtained by conducting a shooting operation by the imaging unit under control of the exposure controller and the focus controller, to thereby create a plurality of in-focus images of mutually different sensitivity values; and an image combining unit for combining with each other the plural in-focus images of mutually different sensitivity values created from the signal processing unit into a combined image and outputting the combined image therefrom.

(2) An imaging device, including an imaging unit including a focus lens having a variable focal distance, an exposure controller for controlling exposure in the imaging unit, to thereby implement a plurality of shooting operations for one subject with mutually different sensitivity values; a camera signal processing unit for executing camera signal processing for a signal outputted from the imaging unit, to thereby create an image signal and a focus evaluation value indicating a degree of focus; an image combining unit for combining with each other a plurality of image signals of mutually different sensitivity values created by the camera signal processing unit into a combined signal and outputting the combined signal therefrom; a dynamic range controller for controlling exposure control processing of the exposure controller, camera signal processing of the camera signal processing unit, and image combining processing of the image combining unit; and a focus controller for controlling the focus lens of the imaging unit based on the focus evaluation value outputted from the camera signal processing unit, to thereby adjust a focal distance of the focus lens, wherein the camera signal processing unit creates a focus evaluation value for each of a plurality of image signals of mutually different sensitivity values outputted from the imaging unit, the focus controller controls the focus lens for shooting operations with substantially equal sensitivity based on focus evaluation values respectively associated therewith, and the image combining unit combines with each other a plurality of image signals of mutually different sensitivity values and in an in-focus state into a combined image signal and outputs the combined image signal therefrom.

(3) An imaging device, including an imaging unit including a focus lens having a variable focal distance, an exposure controller for controlling exposure in the imaging unit, to thereby implement a plurality of shooting operations for one subject with mutually different sensitivity values; a camera signal processing unit for executing camera signal processing for a signal outputted from the imaging unit, to thereby create an image signal and a focus evaluation value indicating a degree of focus; an image combining unit for combining with each other a plurality of image signals of mutually different sensitivity values created by the camera signal processing unit into a combined signal and outputting the combined signal therefrom, wherein in an operation to carry out a plurality of shooting operations for one subject with mutually different sensitivity values, the imaging unit conducts, for each of the sensitivity values, a plurality of shooting operations for one subject with substantially equal sensitivity and with mutually different focal distance values; and the image combining unit combines with each other the image signals of mutually different sensitivity values and mutually different focal distance values into a combined signal and outputs the combined image signal therefrom.

According to the present invention, there is provided an imaging device having an expandable dynamic range for creating a combined image less blurred in the overall image, to thereby increase visibility of the image and recognizability in image recognition thereof.

Other objects, features and advantages of the invention will become apparent from the following description of the embodiments of the invention taken in conjunction with the accompanying drawings.

DESCRIPTION OF THE EMBODIMENTS

Description will now be given of embodiments of the present invention by referring to the drawings.

First Embodiment

Figure 1:
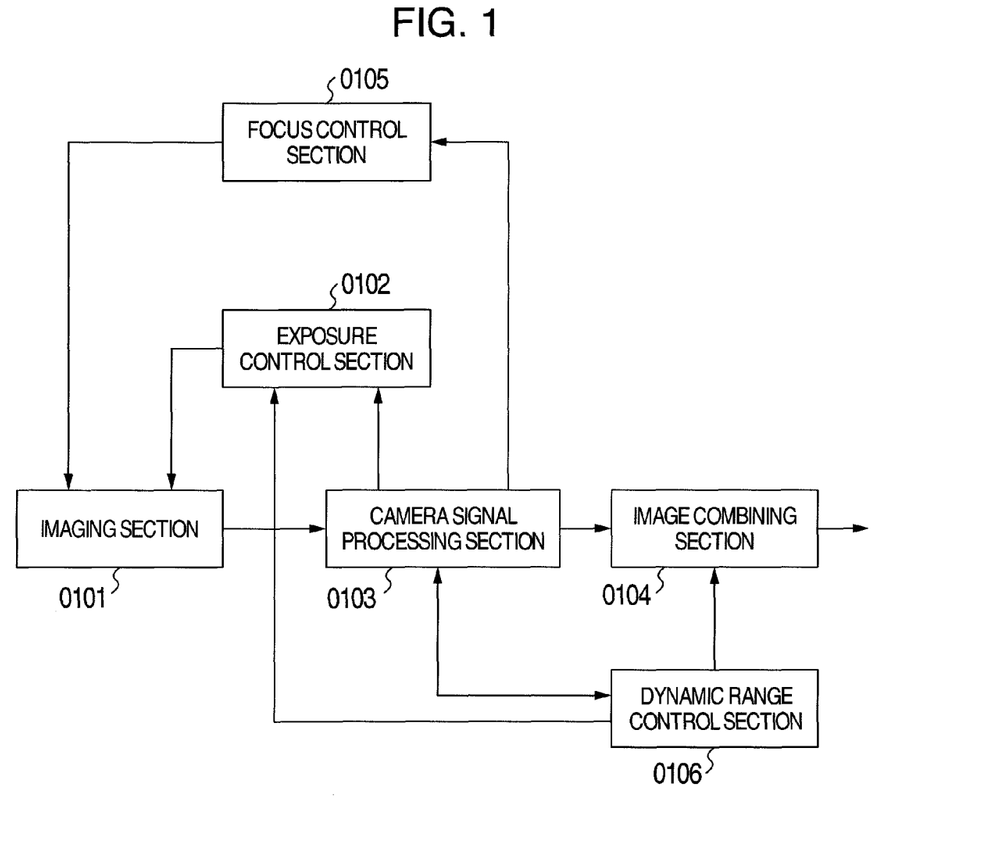
FIG. 1 is a block diagram showing an imaging device in a first embodiment according to the present invention.

FIG. 1 schematically shows an imaging device according to a first embodiment. The imaging device includes an imaging section 0101, an exposure control section 0102, a camera signal processing section 0103, a video or image combining section 0104, a focus control section 0105, and a dynamic range control section 0106.

In the imaging device of FIG. 1, the imaging section 0101 includes, according to necessity, a lens group including a zoom lens and a focus lens, an iris, a shutter, an imaging element such as a Charged Coupled Device (CCD) or a Complementary Metal Oxide Semiconductor (CMOS), a Correlated Double Sampling (CDS)-circuit, an Automatic Gain Controller (AGC), and an Analog-to-Digital (AD) converter. The imaging section 0101 receives an optical image by the imaging element and converts the optical image into an electric signal to output the signal therefrom.

The exposure control section 0102 obtains an evaluation value of actual quantity of exposure from the camera signal processing section 0103, which will be described later, and a target quantity of exposure from the dynamic range control section 0106, which will be described later, and then controls the iris, the shutter timing, and the gain of AGC such that the actual quantity of exposure approaches the target quantity of exposure. In the operation, by changing the target quantity of exposure at a predetermined interval of time, the shooting operation can be conducted with different sensitivity at a predetermined interval of time. For example, by sequentially conducting an exposure control operation in which the shutter is released at timing earlier than an ordinary point of time during a first period of exposure and is then released at timing later than an ordinary point of time during a second period of exposure subsequent to the first period of exposure, it is possible to carry out a high-sensitivity shooting operation to preferentially shoot a subject with low illuminance and a low-sensitivity shooting operation to preferentially shoot a subject with high illuminance. For simplicity of explanation of the embodiment, "shooting a plurality of images different in sensitivity from each other" indicates conducting a high-sensitivity shooting operation for a subject with low illuminance and a low-sensitivity shooting operation for a subject with high illuminance as above. However, this is only an example, and it is not necessarily required to employ a combination of the shutter timing earlier than an ordinary point of time and the shutter timing later than an ordinary point of time. It is also possible to conduct the exposure control operation by using three or more different sensitivity values at a predetermined interval of time. Further, the high-sensitivity and low-sensitivity shooting operations may be alternately conducted to produce a combined image as a result of the shooting operations, to sequentially output the combined image as a mobile image. Or, the different exposure control operation may be employed only at particular timing.

The camera signal processing section 0103 executes, according to necessity, various digital signal processing for the signal produced from the imaging section 0101 such as signal separation processing to produce a luminance signal and a color signal, brightness correction processing, gamma processing, color difference conversion processing, white balance correction processing, and digital zoom processing, to thereby produce an image signal to output the signal to the image combining section 0104. Values of factors for the signal processing such as quantity of brightness correction and the gamma characteristic may be beforehand set to be stored in, for example, an Electrically Erasable Programmable Read-Only Memory (EEPROM). Or, control values may be changed according to various information pieces such as a luminance distribution of an image. Based on control information from the dynamic range control section 0106, it is possible, by using mutually different values of factors for a plurality of exposure images different in sensitivity, to appropriately execute signal processing such as gamma processing for each exposure image.

For the signal produced from the imaging section 0101, the camera signal processing section 0103 calculates various statistic information pieces such as an evaluation value of quantity of exposure, a luminance distribution, and a focus evaluation value and outputs the calculated information pieces to the exposure control section 0102, the dynamic range control section 0106, and the focus control section 0105. The focus evaluation value is an evaluation value indicating the matching degree of the focus in an image and can be obtained as an integral of a high-frequency band component of the image signal, for example, in the overall image or part of the image. As the degree of focus increases, the subject is more clearly produced in the image and the difference between adjacent pixels is greater. Hence, the high-frequency band component increases in the overall image and the focus evaluation value also becomes greater.

For image signals from the camera signal processing section 0103, the image combining section 0104 combines image signals of different exposure periods with each other at a predetermined ratio based on control information from the dynamic range control section 0106 to produce a combined signal and then outputs the combined signal to, for example, an image display section, a recording section, a mobile picture compression section, and a Personal Computer (PC), not shown. This operation may be implemented, for example, as below. An image signal of a first exposure period is stored in a memory such as a Random Access Memory (RAM). Thereafter, the image signal is read from the memory to be weighted and is then added to an image signal of a second exposure period. By repeatedly conducting the addition of image signals, it is possible to combine a desired number of image signals with each other, the signals being different in sensitivity from each other. This makes it possible to implement a wide dynamic range function in which images of subjects ranging from a subject with low illuminance to a subject with high illuminance can be produced in continuous gradation including all gradation levels. As a method of creating a combined signal using image signals different in sensitivity from each other, there may be employed not only the method in which image signals of different exposure periods are weighted and then are added to each other, but also a method in which for each pixel, the image signal of either one of the exposure periods is selected. When the wide dynamic range function is not used, the image signals may be outputted without conducting the signal combining operation.

Based on the focus evaluation value from the camera signal processing section 0103, the focus control section 0105 controls the focus of the focus lens such that the imaging section 0101 is at a position corresponding to the focal distance for an in-focus state. Specifically, for example, the shooting operation is beforehand conducted a plurality of times for substantially the same exposure period by changing the focus, to obtain focus evaluation values. By comparing the focus evaluation values with each other, the direction in which the focus evaluation values become larger is recognized as an in-focus direction to an in-focus position. By changing the focus, the shooting operation is conducted a plurality of times, and the obtained focus evaluation values are similarly compared with each other. This operation is repeatedly carried out until the focus evaluation value takes a peak value. Through the operation, it is possible to appropriately focus the focus lens on the subject. The focus control operation may be conducted, for example, as below. For a focus lens having a focal length which can be varied by moving the focus lens in a direction parallel to the optical axis by a stepping motor, it is possible, by driving the stepping motor using pulse signals, to adjust the focus according to a predetermined focal distance. Or, when using a liquid lens of, for example, WO03/102636, it is possible to change the refractive index of the liquid by applying a voltage thereto, to thereby control the focus in association with the predetermined focal distance.

When the imaging section 0101 conducts a shooting operation of a subject using different exposure periods under control of the exposure control section 0102, the focus control section 0105 optimally carries out focus control for the shooting operation. That is, for the high-sensitivity shooting operation, a shooting operation is beforehand conducted as preprocessing with the same sensitivity such that the camera signal processing section 0103 processes image signals obtained by the shooting operation, to thereby create focus evaluation values. Based on the focus evaluation values, the focus control section 0105 predicts an optimal focal distance for the high-sensitivity shooting operation. Similarly, for the low-sensitivity shooting operation, an optimal focal distance is predicted through the pre-processing for the low-sensitivity shooting operation. When actually using the wide dynamic range function, even if the distance between the subject and the camera largely varies between the high-sensitivity and low-sensitive shooting operations, it is possible, by shooting a subject in the high-sensitivity and low-sensitive shooting operations by use of the respective focal distance values, to create clear images of the respective subjects in the in-focus state. The image combining section 0104 combines these images with each other to produce a wide dynamic range image with a large depth of field and less blurred in the overall image.

In order that the image combining section 0104 creates and outputs an image with a wide dynamic range by use of the image signal from the imaging section 0101, the dynamic range control section 0106 operates as below. Based on information of the luminance distribution of the image and predetermined control target items obtained from the camera signal processing section 0103 and information such as user setting values from a user interface, not shown, the dynamic range control section 0106 determines information for each of the plural images mutually different in sensitivity such as an exposure target value of the exposure control section 0102, a factor for the camera signal processing in the camera signal processing section 0103, and an image signal combining ratio for the image combining operation by the image combining section 0104 and then outputs the determined information as control information therefrom. As a result, even for a scene with an extreme difference in brightness between a bright area and a dark area in the scene, i.e., with a large illuminance difference therebetween, it is possible to create a wide dynamic range image which is neither whitened nor blackened in any part thereof.

The exposure control processing of the exposure control section 0102, the camera signal processing in the camera signal processing section 0103, the image combining processing in the image combining section 0104, the focus control processing in the focus control section 0105, and the dynamic range control processing in the dynamic range control section 0106 are ordinarily executed by a microcomputer, a camera signal processing Image Signal Processor (ISP), or a dedicated Large Scale Integration (LSI) in a camera.

Figure 2A:
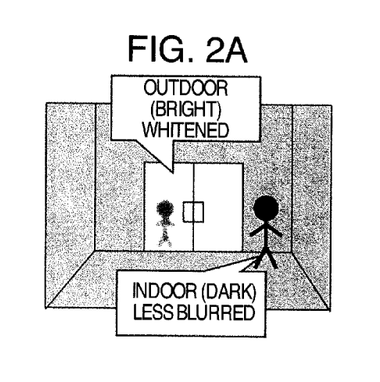
FIG. 2A is a diagram showing an example of focus control processing in the imaging device of the first embodiment.
Figure 2B:
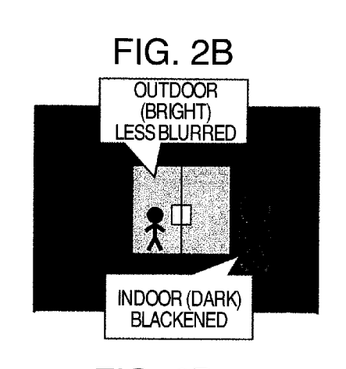
FIG. 2B is a diagram showing an example of focus control processing in the imaging device of the first embodiment.
Figure 2C:
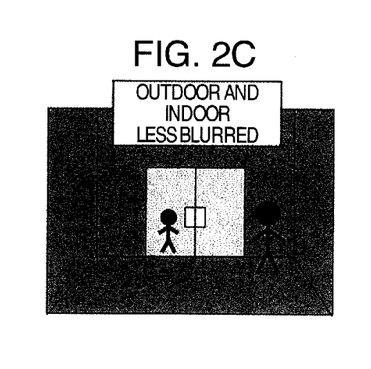
FIG. 2C is a diagram showing an example of focus control processing in the imaging device of the first embodiment.
Figure 2D:
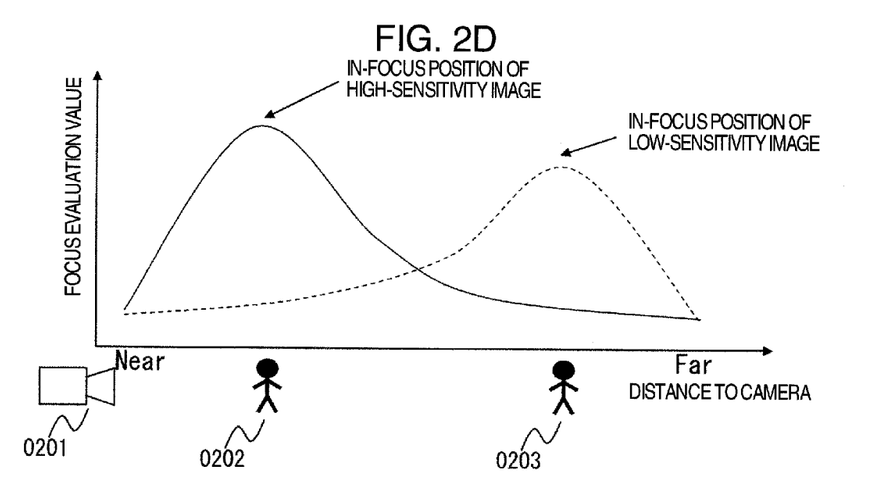
FIG. 2D is a graph to explain an example of focus control processing in the imaging device of the first embodiment.

FIGS. 2A to 2D show examples of focus control processing in the imaging device of the first embodiment. The focus control processing is executed by the focus control section 0105. It is assumed in FIGS. 2A to 2D that a camera 0201 in a room shoots a person 0202 in a dark room less apart from the camera 0201 and a person 0203 in a bright environment outside the room more apart from the camera 0201 at the same time. FIG. 2A shows an image obtained through the high-sensitivity shooting operation by the imaging section 0101. FIG. 2B is an image e obtained through the low-sensitivity shooting operation by the imaging section 0101. FIG. 2C is a combined image produced through image combining processing by the image combining section 0104. FIG. 2D graphically shows a change in the focus evaluation value obtained from the camera processing section 0103 when the focus is moved from the near end to the far end in the high-sensitivity and low-sensitivity shooting operations. When the imaging section 0101 carries out the high-sensitivity shooting operation, the focus control section 0105 conducts focus control based on the focus evaluation value obtained from the high-sensitivity image created through the high-sensitivity shooting operation indicated by a solid line in FIG. 2D. In the high-sensitivity shooting operation, the image of the subject outside the room is saturated and whitened. Hence, the focus evaluation value takes the largest value when the focus lens is focused on the person 0202 in the dark room. It is hence possible to create an image in which the person 0202 in the room is clearly viewed as shown in FIG. 2A. When the imaging section 0101 carries out the low-sensitivity shooting operation, the focus control operation is conducted based on the focus evaluation value obtained from the low-sensitivity image created through the low-sensitivity shooting operation indicated by a dotted line in FIG. 2D, to thereby create an image in which the person 0203 outside the room is clearly viewed as shown in FIG. 2B. The image combining section 0104 combines the images respectively obtained through the low-sensitivity and high-sensitivity shooting operations with each other into a combined image in which the subject in the dark room less apart from the camera and the subject in the bright environment outside the room more apart from the camera are in the in-focus state as shown in FIG. 2C.

According to the present embodiment, due to the wide dynamic range function implemented by combining with each other a plurality of images obtained using different sensitivity values, even in a shooting operation of a scene with an extreme difference in brightness between a bright part and a dark part thereof, there appears neither blackened part nor whitened part in the combined image by expanding the dynamic range. It is hence possible to produce a clear image in which a subject in a dark area and a subject in a bright area are in the in-focus state, to thereby increase visibility of the image.

Second Embodiment

Figure 3:
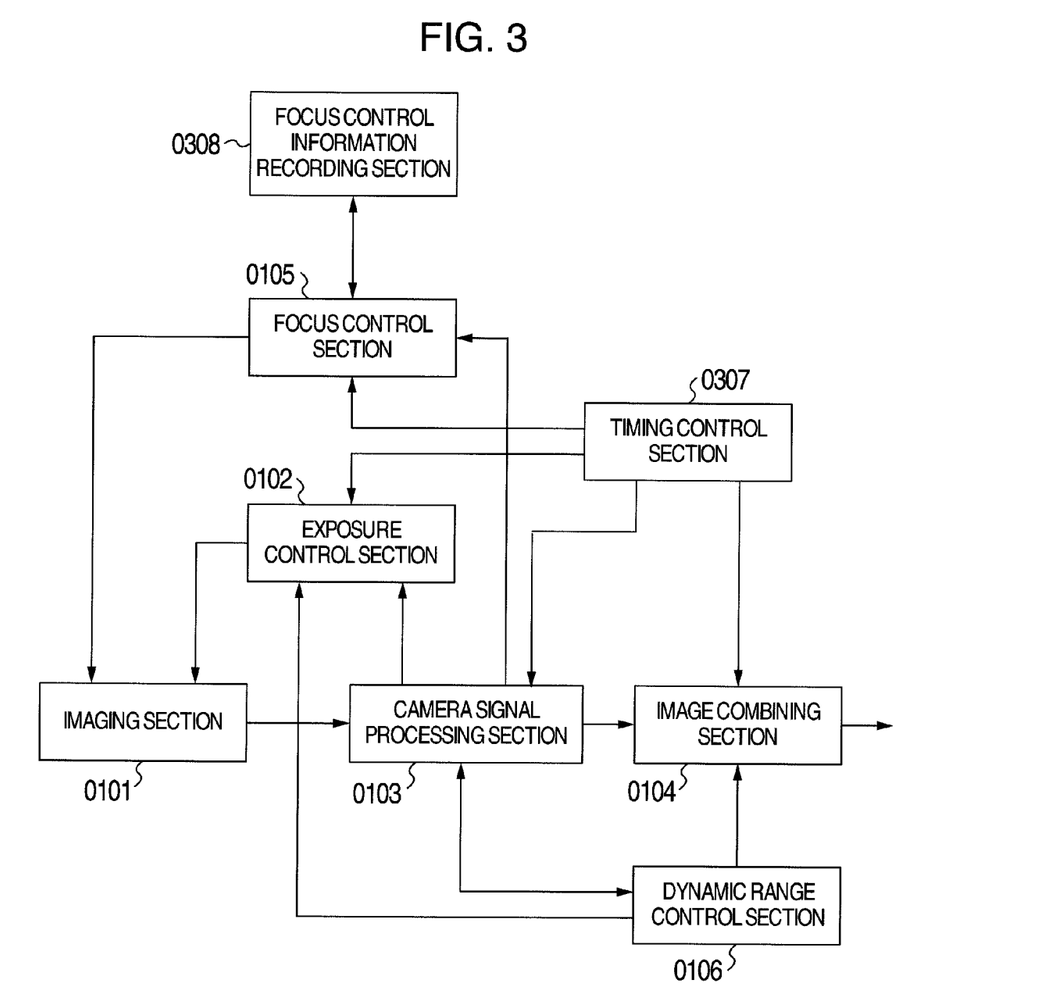
FIG. 3 is a schematic diagram showing an example of an imaging device in a second embodiment according to the present invention.

FIG. 3 schematically shows an example of an imaging device according to a second embodiment of the present invention. The imaging device includes an imaging section 0101, an exposure control section 0102, a camera signal processing section 0103, an image combining section 0104, a focus control section 0105, a dynamic range control section 0106, a timing control section 0307, and a focus control information recording section 0308. The imaging device of FIG. 3 is implemented by adding the timing control section 0307 and the focus control information recording section 0308 to the configuration of the imaging device of the first embodiment. The same constituent components as those of the first embodiment will be described according to necessity.

In the imaging device of FIG. 3, the timing control section 0307 controls timing to execute the exposure control processing in the exposure control section 0102, the camera signal processing in the camera signal processing section 0103, the image combining processing in the image combining section 0104, and the focus control processing in the focus control section 0105. Assume, for example, a situation in which to create mobile images by use of the wide dynamic range function in real-time fashion, the imaging section 0101 alternately conducts the high-sensitivity and low-sensitivity shooting operations and the image combining section 0104 combines the images from the imaging section 0101 with each other to produce a combined image. In this situation, the timing control section 0307 conducts timing control so that the exposure control processing, the camera signal processing, the image combining processing, and the focus control processing are correctly carried out at timing synchronized with each other for the high-sensitivity and low-sensitivity shooting operations with combining the high-sensitivity image and the low-sensitivity image. The timing control processing of the timing control section 0307 will be described later in detail by referring to FIG. 4.

The focus control information recording section 0308 includes a recording device such as an EEPROM and/or an RAM. From the focus control section 0105, the recording section 0308 obtains information to be used by the focus control section 0105 to control the focus of the imaging section 0101, for example, information of the focal distance of the imaging section 0101, information of the focus evaluation value obtained from the camera signal processing section 0103, and/or values appearing in the process of a calculation conducted based on the focus evaluation value. The recording section 0308 then writes the obtained information in the recording device. Or, the recording section 0308 reads such information from the recording device to deliver the information to the focus control section 0105. In a situation in which the imaging section 0101 alternately conducts the high-sensitivity and low-sensitivity shooting operations, if an optimal in-focus state cannot be established through one focus control operation, the focus control section 0105 once outputs associated control information to the focus control information recording section 0308. At the next control timing, the focus control section 0105 obtains the previous control information from the recording section 0308 to resume the focus control processing. Therefore, even when the imaging section 0101 alternately conducts the high-sensitivity and low-sensitivity shooting operations, the focus control processing can be successively and appropriately executed for the respective operations. The focus control information recording processing of the focus control information recording section 0308 will be described later in detail by referring to FIG. 6. As a result, also when the mobile image shooting operation is conducted in a real-time fashion, the focus can be optimally adjusted for the high-sensitivity and low-sensitivity shooting operations, to thereby obtain a clear image with a wide dynamic range and less blurred in the overall image.

Figure 4:
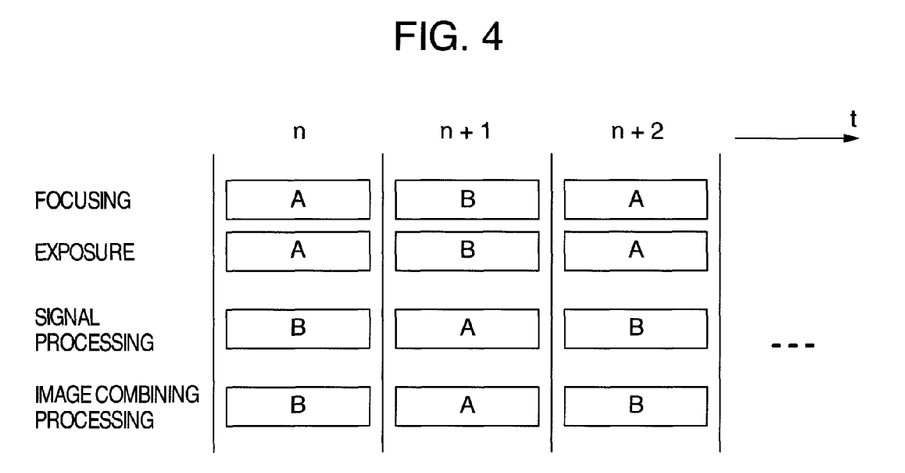
FIG. 4 is a first diagram showing an example of timing control processing in the imaging device of the second embodiment.

FIG. 4 is a first diagram showing an example of the timing control processing in the imaging device of the second embodiment. In FIG. 4, control for a high-sensitivity shooting operation is indicated by A and control for a low-sensitivity shooting operation is indicated by B. The timing control processing shown in FIG. 4 is executed by the timing control section 0307. In FIG. 4, the abscissa represents the lapse of time, and one small frame or row indicates, for example, a sensor driving operation or camera signal processing to be implemented per unitary period of time. For a camera which operates, for example, at 30 frames per second, about 33.3 milliseconds (ms) are allocated to the processing of one row. FIG. 4 schematically shows operations for easy understanding of the present invention. In actual timing control, the processing may be executed exceeding one row, i.e., one frame. In the example of FIG. 4, it is assumed that the imaging section 0101 alternately carries out the high-sensitivity and low-sensitivity shooting operations, and A indicates control for the high-sensitivity shooting operation and B indicates control for the low-sensitivity shooting operation. At time n for exposure in the high-sensitivity shooting operation, focusing and exposure are implemented for the high-sensitivity shooting operation. At time n+1 at which the image signal obtained through the exposure is fed to the camera signal processing section 0103, the camera signal processing section 0103 executes the camera signal processing for high-sensitivity image signals and the image combining section 0104 executes the image combining processing for high-sensitivity image signals. Similarly, at time n+1, the focusing and the exposure are achieved for the low-sensitivity shooting operation. At time n+2, the camera signal processing and the image combining processing are executed for low-sensitivity image signals. The processing may be executed by disposing, in the timing control section 0307, a loop counter to keep therein a value which changes at a lapse of a predetermined period of time or at interruption by an external timer, to thereby control timing of execution for each processing by referring to the loop counter. As a result, even when the imaging section 0101 alternately conducts the high-sensitivity and low-sensitivity shooting operations, it is possible to appropriately carry out focus control for the respective operations, to thereby implement the wide dynamic range.

Figure 5:
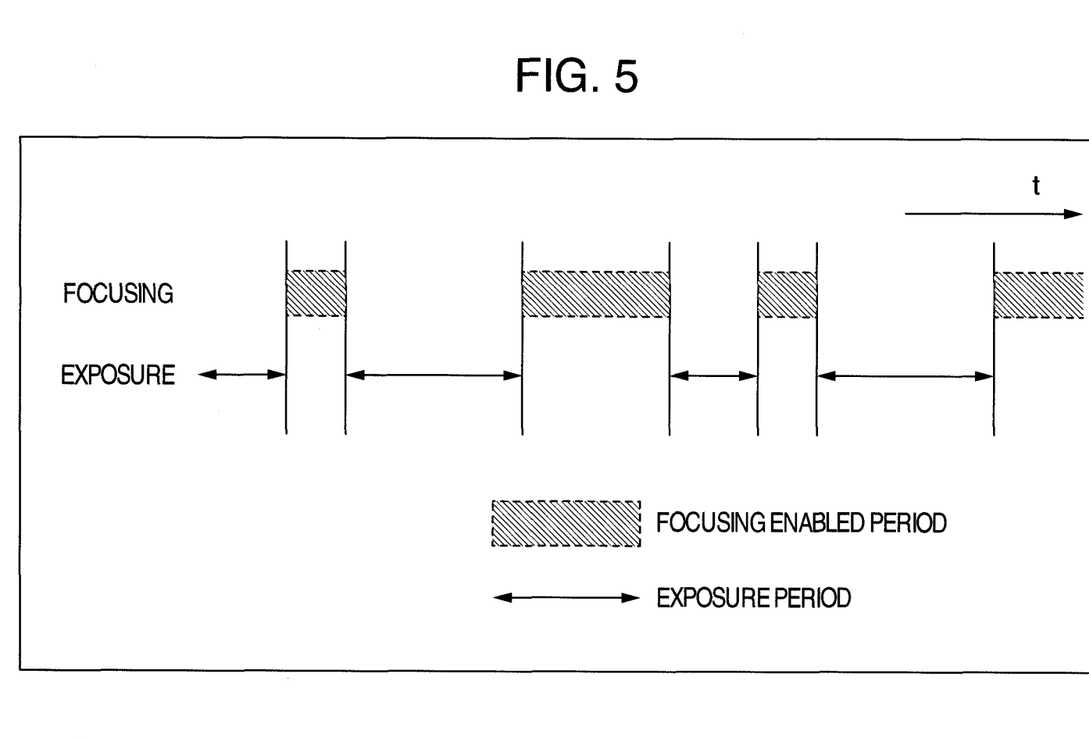
FIG. 5 is a second diagram showing an example of timing control processing in the imaging device of the second embodiment.

FIG. 5 is a second diagram showing an example of the timing control processing in the imaging device of the second embodiment. The timing control processing is executed by the timing control section 0307. In the processing of FIG. 4, the processing executed by each block is controlled in units of frames. It is further possible to control processing timing in each frame. FIG. 5 schematically shows the focusing timing and exposure timing of the imaging section 0101. The imaging section 0101 alternately conducts the high-sensitivity and low-sensitivity shooting operations in this example. The period of exposure time indicated by arrows is uniquely determined by a synchronizing signal of a sensor and a shutter timing signal outputted from the exposure control section 0102. The timing control section 0307 determines timing for the focus control section 0105 to conduct focus control such that the focusing is completed during a period of time indicated by dotted lines in FIG. 5 in which the imaging section 0101 is not conducting exposure. This makes it possible that the imaging section 0101 completes the focusing before starting the exposure, to thereby suppress the blur in the image, the blur taking place due to a change in the focal distance during the exposure period. When using a sensor not having a period of time in which exposure is not conducted, for example, a CMOS sensor in which the exposure is sequentially carried out for each line exceeding one frame by employing a rolling shutter, the focus control timing may be determined such that the focusing is conducted, for example, by assuming, as the center, the period of time in which the upper-most or lower-most line of the screen is being exposed. In this situation, although the image may be slightly blurred in the end sections of the screen, it is possible to suppress the blur in the image near the central section of the screen including the main subject of the image. The present invention is not restricted by the timing control processing described above. Various variations thereof may be implemented by use of the timing control section 0307.

Figure 6:
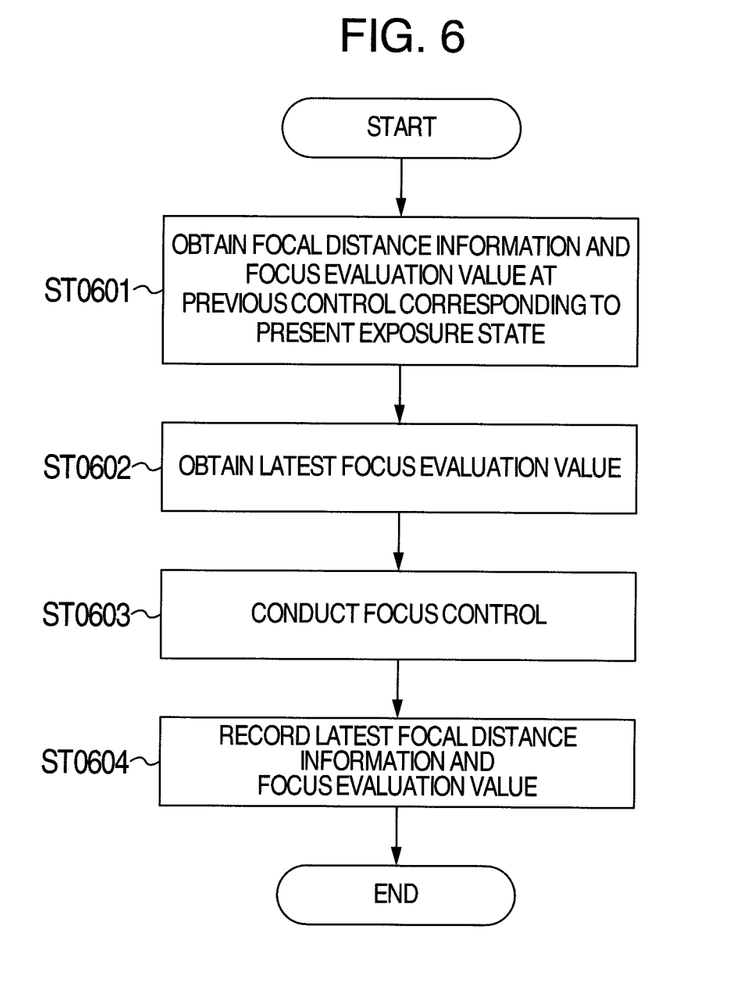
FIG. 6 is a flowchart showing an example of focus control information recording processing in the imaging device of the second embodiment.

FIG. 6 shows an example of the focus control information recording processing in the imaging device of the second embodiment in a flowchart. The information recording processing is executed by the focus control section 0105 and the focus control information recording section 0308. In step ST0601 of the processing sequence of FIG. 6, the focus control section 0105 obtains the focal distance information and the focus evaluation value of the previous focus control operation for the present exposure state from the focus control information recording section 0308. For example, in a situation in which the imaging section 0101 alternately carries out the high-sensitivity and low-sensitivity shooting operations, when the focus control section 0105 conducts focus control for the focusing in the high-sensitivity shooting operation, the focus control section 0105 obtains the focal distance information and the focus evaluation value which are used to control the previous high-sensitivity shooting operation and which are recorded. Whether or not the focus control section 0105 conducts focus control for the high-sensitivity shooting operation can be judged based on the timing control information from the timing control section 0307. In step ST0602, the focus control section 0105 obtains the latest focus evaluation value from the camera signal processing section 0105, the value being calculated by conducting the image signal processing for the signal resultant from the high-sensitivity shooting operation. In step ST0603, based on the focal distance information and the focus evaluation value associated with the previous high-sensitivity shooting operation and the focus evaluation value of the latest high-sensitivity shooting operation, the focus control section 0105 determines the focal distance for the next high-sensitivity exposure in the imaging section 0101 and conducts focus control according to the focal distance. In step ST0604, the focus control section 0105 records the focal distance information for the latest high-sensitivity shooting operation determined in step ST0603 and the focus evaluation value for the latest high-sensitivity shooting operation obtained in step ST0602, in the focus control information recording section 0308. The recording section 0308 records the focal distance information and the focus evaluation value for each of the high-sensitivity and low-sensitivity shooting operations in mutually different areas in the recording device. Hence, even when the focus control for the high-sensitivity shooting operation and the focus control for the low-sensitivity shooting operation are alternately carried out for respective frames, the focus control processing can be independently and continuously executed.

According to the second embodiment, due to the wide dynamic range function implemented by combining with each other a plurality of images obtained using different sensitivity values, even in a shooting operation of mobile images in a real-time fashion as well as in a shooting operation of a scene with an extreme difference in brightness between a bright part and a dark part thereof, there appears neither blackened part nor whitened part in the combined image by expanding the dynamic range. It is hence possible to produce a clear image in which a subject in a dark area and a subject in a bright area are in the in-focus state, to thereby increase visibility of the image.

Third Embodiment

Referring to FIG. 1, description will be given of an imaging device according to a third embodiment of the present invention. The third embodiment is substantially equal in structure to the first embodiment shown in FIG. 1. However, in the shooting operations with a plurality of mutually different sensitivity values, the imaging section 0101 of the third embodiment does not uniquely set an in-focus state in the shooting operations with the respective sensitivity values, but sets mutually different in-focus states in the shooting operations with the respective sensitivity values. That is, a plurality of shooting operations are carried out by combining a plurality of sensitivity values and a plurality of focal distance values. The plural focal distance values may be determined as below. For example, when the imaging section 0101 conducts the high-sensitivity and low-sensitivity shooting operations, the focus control section 0105 detects the in-focus position for each of the high-sensitivity and low-sensitivity shooting operations. At the in-focus position for the high-sensitivity shooting operation, the imaging section 0101 conducts the high-sensitivity and low-sensitivity shooting operations. At the in-focus position for the low-sensitivity shooting operation, the imaging section 0101 conducts the high-sensitivity and low-sensitivity shooting operations. That is, the imaging section 0101 conducts the shooting operation four times to determine the focal distance values. Or, several focal distance values may be beforehand determined such that the imaging section 0101 conducts the high-sensitivity and low-sensitivity shooting operations by using the respective focal distance values. For the plural images different in the sensitivity and the focal distance from each other, the image combining section 0104 executes the focus combining processing and the image combining processing to expand the dynamic range. This makes it possible to create an image with high visibility in which the depth of field is increased and the dynamic range is widened.

Figure 7:
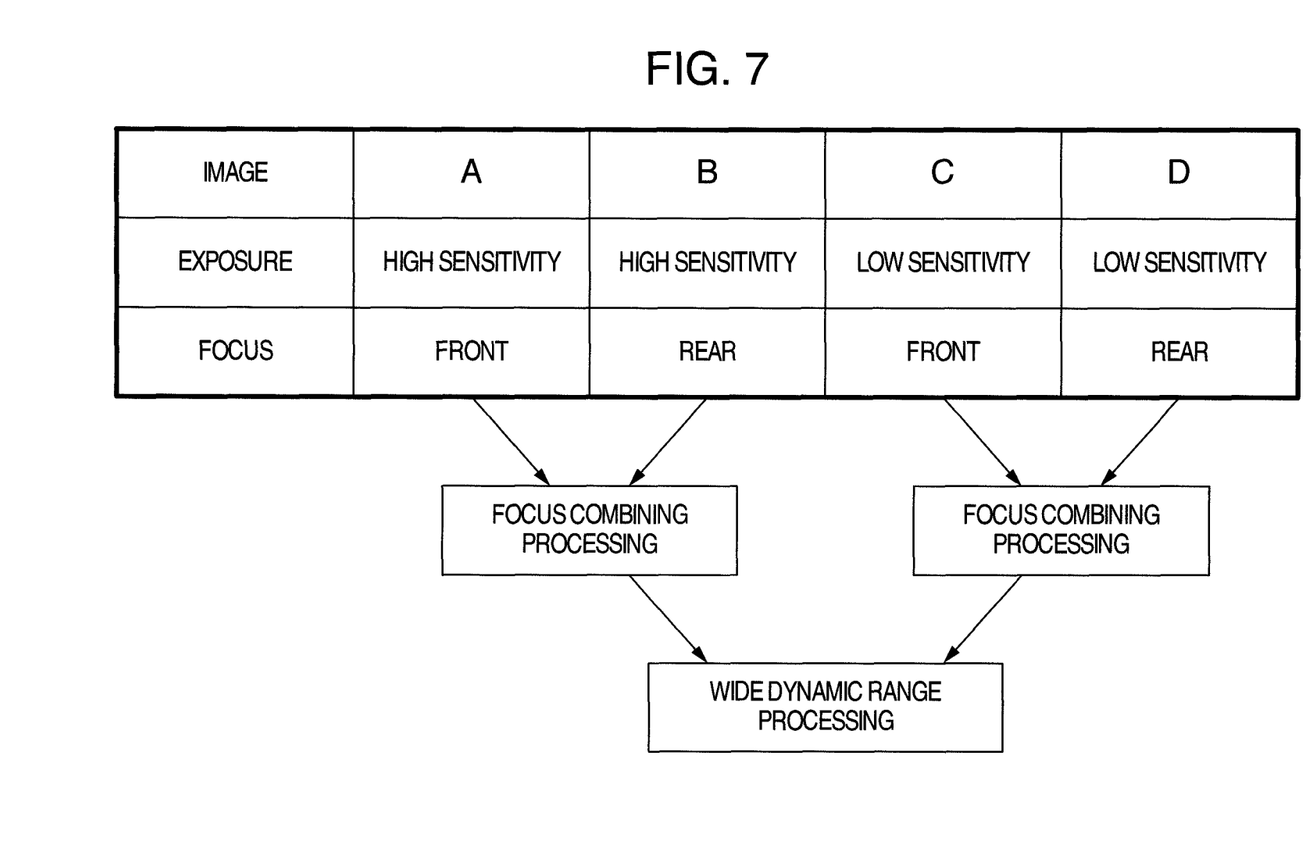
FIG. 7 is a diagram showing an example of video or image combining processing of an imaging device in a third embodiment according to the present invention.

FIG. 7 is a diagram showing an example of the image combining processing of the imaging device in the third embodiment. The image combining processing is executed by the image combining section 0104. In FIG. 7, images A to D are images obtained by shooting one subject using different sensitivity values and different focal points. For the images which are substantially equal in the sensitivity to each other and which are different in the focal distance from each other, namely, a pair of images A and B and a pair of images C and D in this example, the image combining section 0104 first executes the focus combining processing to combine the images of each pair with each other. The focus combining processing may be executed, for example, as below. For each small area of each of the images, an edge component is detected in each of the paired images, and an image signal of the image having a larger edge component is employed as an image signal for the combined image after the combining operation. As a result, from the plural images of different focal distance values, areas in the in-focus state are selected to be combined with each other, to thereby create an image less blurred in the overall image. Also, it is possible that by detecting not only the edge component but also a luminance distribution and a luminance level in the small area, the blur is preferentially detected in the vicinity of a whitened or blackened area in the image, to employ in subsequent processing an image signal of an image less blurred. For the combined images for which the focus combining processing is executed for respective sensitivity values, the image combining processing is further executed to widen the dynamic range. As a result, it is possible to obtain an image with high visibility in which the depth of field is increased and the dynamic range is widened. The present invention is not restricted by the image combining sequence described above. For example, for a pair of images A and C and a pair of images B and D produced using the same focal distance, it is also possible that the image combining processing is first executed to widen the dynamic range to create combined images, and thereafter, the focus combining processing is executed for the combined images.

Figure 8A:
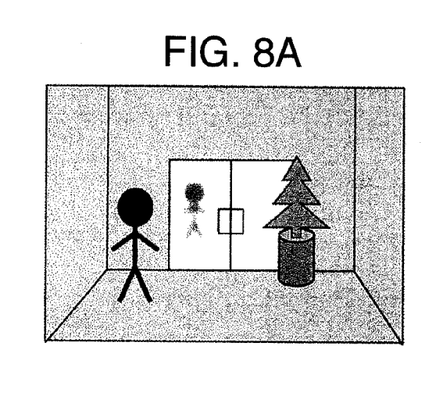
FIG. 8A is a diagram showing an example of video combining processing in the imaging device of the third embodiment.
Figure 8B:
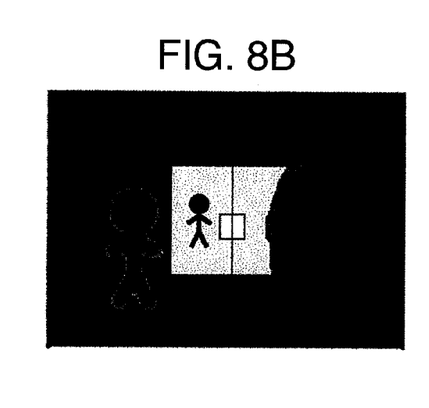
FIG. 8B is a diagram showing an example of video combining processing in the imaging device of the third embodiment.
Figure 8C:
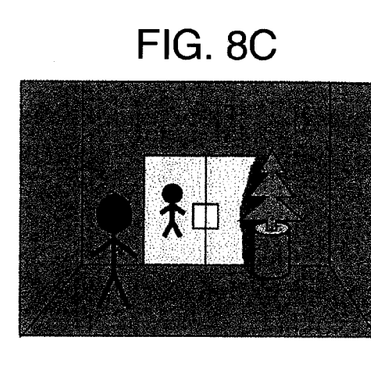
FIG. 8C is a diagram showing an example of video combining processing in the imaging device of the third embodiment.
Figure 8D:
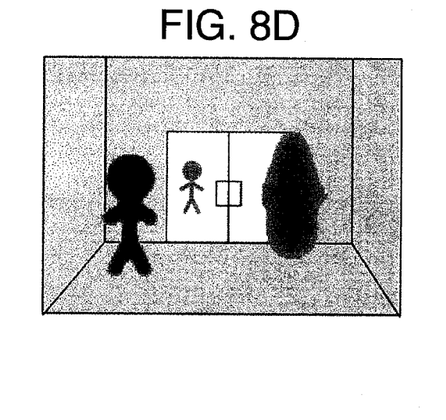
FIG. 8D is a diagram showing an example of video combining processing in the imaging device of the third embodiment.
Figure 8E:
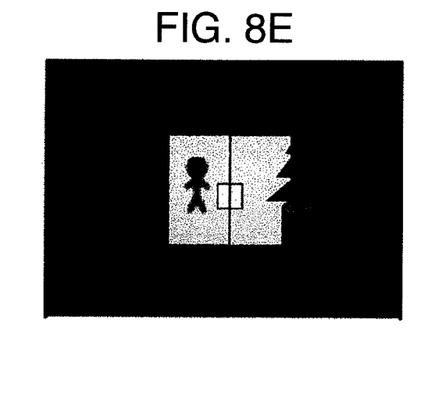
FIG. 8E is a diagram showing an example of video combining processing in the imaging device of the third embodiment.
Figure 8F:
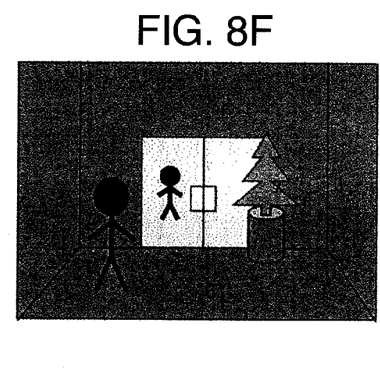
FIG. 8F is a diagram showing an example of video combining processing in the imaging device of the third embodiment.

FIGS. 8A to 8F are diagrams showing an example of the video combining processing in the imaging device of the third embodiment. It is assumed in FIGS. 8A to 8F that a shooing operation is conducted using a camera to shoot a person and an ornamental plant in a dark room near the camera installed in the room and a person in a bright outdoor environment apart from the camera at the same time. FIG. 8A is an image obtained with high sensitivity by setting the subject in the room to the in-focus state and corresponds to image A of FIG. 7. FIG. 8B is an image obtained with low sensitivity by setting the subject in the outdoor environment to the in-focus state and corresponds to image D of FIG. 7. FIG. 8C is a combined image created by combining image A of FIG. 8A with image D of FIG. 8B. FIG. 8D is an image obtained with high sensitivity by setting the subject in the outdoor environment to the in-focus state and corresponds to image B of FIG. 7. FIG. 8E is an image obtained with low sensitivity by setting the subject in the room to the in-focus state and corresponds to image C of FIG. 7. FIG. 8F is a combined image created by combining images A to D of FIG. 7 with each other. In image D shown in FIG. 8B, the ornamental plant is out of focus in the vicinity of a boundary of the blackened area and is blurred and enlarged. Hence, when images A and D are combined with each other, the in-focus image of the plant is superimposed over the blurred and enlarged out-of-focus image of the plant. This results in an unnatural image as shown in FIG. 8C. On the other hand, in image C shown in FIG. 8E, the subject in the room is shot with low sensitivity in the in-focus state and no blur appears in the image of the plant in the room even in the vicinity of the boundary of the blackened area. Hence, in the image combining processing, the focus combining processing is first executed for images C and D to suppress the blur in the plant image in the vicinity of the boundary of the blackened area and the blur in the image of the subject in the outdoor environment. Thereafter, for the resultant image and the high-sensitivity images, the combining processing to expand the dynamic range is executed, to resultantly obtain a natural image without any blur in the overall image as shown in FIG. 8F.

In the third embodiment, by combining a plurality of images with each other according to the sensitivity and the focal distance, the depth of field is increased and the dynamic range is expanded to obtain a natural image, to thereby increase visibility of the image.

The present invention is not restricted by the embodiments described above and includes various variations and modifications thereof. The embodiments have been described only for easy understanding of the present invention. The present invention is not limited to any configuration including all constituent components described above. Also, part of the configuration of an embodiment may be replaced by part of the configuration of another embodiment. The configuration of an embodiment may be added to that of another embodiment. The present invention is applicable to digital video cameras and still cameras which are employed in various fields, for example, for noncommercial uses, for monitoring operation, as units to be mounted on a vehicle, for cellular phones, and for industrial uses.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. An imaging device, comprising:
   imaging means comprising a focus lens having a variable focal distance;
   exposure control mean for controlling exposure of the imaging means;
   focus control means for controlling the focus lens for a plurality of shooting operations by the imaging means with different sensitivity values under control of the exposure control mean, to thereby obtain a predetermined focal distance for each of the sensitivity values;
   signal processing means for processing a signal obtained by conducting a shooting operation by the imaging means under control of the exposure control mean and the focus control means, to thereby create a plurality of in-focus images of mutually different sensitivity values; and
   image combining means for combining with each other the plural in-focus images of mutually different sensitivity values created from the signal processing means into a combined image and outputting the combined image therefrom;
   wherein the signal processing means processes a signal obtained by conducting a shooting operation by the imaging means, to thereby create focus evaluation values respectively corresponding to a plurality of signals of mutually different sensitivity values; and
   wherein the focus control means beforehand sets focal distance for each of the sensitivity values based on the focus evaluation value created by the signal processing means.

2. An imaging device according to claim 1, further comprising timing control means for controlling exposure control timing of the exposure control means, signal processing timing of the signal processing means, image combining timing of the image combining means, and focus control timing of the focus control means.

3. An imaging device according to claim 1, wherein the focus control means conducts control to drive a focus of the imaging means to move during a period of time in which the imaging means is not conducting exposure.

4. An imaging device, comprising:
   imaging means comprising a focus lens having a variable focal distance;
   exposure control mean for controlling exposure in the imaging means, to thereby implement a plurality of shooting operations for one subject with mutually different sensitivity values;
   camera signal processing means for executing camera signal processing for a signal outputted from the imaging means, to thereby create an image signal and a focus evaluation value indicating a degree of focus;
   image combining means for combining with each other a plurality of image signals of mutually different sensitivity values created by the camera signal processing means into a combined signal and outputting the combined signal therefrom;
   dynamic range control means for controlling exposure control processing of the exposure control means, camera signal processing of the camera signal processing means, and image combining processing of the image combining means; and
   focus control means for controlling the focus lens of the imaging means based on the focus evaluation value outputted from the camera signal processing means, to thereby adjust a focal distance of the focus lens, wherein:
   the camera signal processing means creates a focus evaluation value for each of a plurality of image signals of mutually different sensitivity values outputted from the imaging means;
   the focus control means controls the focus lens for shooting operations with substantially equal sensitivity based on focus evaluation values respectively associated therewith; and
   the image combining means combines with each other a plurality of image signals of mutually different sensitivity values and in an in-focus state into a combined image signal and outputs the combined image signal therefrom.

5. An imaging device according to claim 4, further comprising:
   timing control means for controlling exposure control timing of the exposure control means, signal processing timing of the camera signal processing means, image signal combining timing of the image combining means, and focus control timing of the focus control means, wherein
   the timing control means controls the signal processing timing of the camera signal processing means and the control timing of the focus control means such that the camera signal processing means creates a focus evaluation value for each of the plural image signals of mutually different sensitivity values outputted from the imaging means and the focus control means controls the focus lens for shooting operations with substantially equal sensitivity based on focus evaluation values respectively associated therewith.

6. An imaging device according to claim 5, further comprising:

focus control information recording means for writing therein and reading therefrom control information to be used by the focus control means to conduct focus control, wherein when controlling a focus for a plurality of shooting operations with mutually different sensitivity values by the imaging means based on timing controlled by the timing control means, the focus control means reads, from the focus control information recording means, control information in a shooting operation with sensitivity in the past, the sensitivity being substantially equal to that in the pertinent focus control; employs the control information for the pertinent focus control of the imaging means, and records latest control information in the shooting operation with the sensitivity in the focus control information recording means.

7. An imaging device according to claim 4, wherein the focus control means conducts control to drive a focus of the imaging means to move only during a period of time in which the imaging means is not conducting exposure.

8. An imaging device, comprising:

imaging means comprising a focus lens having a variable focal distance;

exposure control mean for controlling exposure in the imaging means, to thereby implement a plurality of shooting operations for one subject with mutually different sensitivity values;

camera signal processing means for executing camera signal processing for a signal outputted from the imaging means, to thereby create an image signal and a focus evaluation value indicating a degree of focus;

image combining means for combining with each other a plurality of image signals of mutually different sensitivity values created by the camera signal processing means into a combined signal and outputting the combined signal therefrom, wherein:

in an operation to carry out a plurality of shooting operations for one subject with mutually different sensitivity values, the imaging means conducts, for each of the sensitivity values, a plurality of shooting operations for one subject with substantially equal sensitivity and with mutually different focal distance values; and the image combining means combines with each other the image signals of mutually different sensitivity values and mutually different focal distance values into a combined signal and outputs the combined image signal therefrom.

* * * * *

UNITED STATES PATENT AND TRADEMARK OFFICE
CERTIFICATE OF CORRECTION

| | | |
|---|---|---|
| PATENT NO. | : 8,830,338 B2 | |
| APPLICATION NO. | : 13/570447 | |
| DATED | : September 9, 2014 | |
| INVENTOR(S) | : Shinichiro Hirooka et al. | |

It is certified that error appears in the above-identified patent and that said Letters Patent is hereby corrected as shown below:

Title page,

At item (73) Assignee:

"Hitachi Ltd, Tokyo (JP)" should read -- Hitachi, Ltd., Tokyo (JP) --

Signed and Sealed this
Nineteenth Day of January, 2016

Michelle K. Lee
*Director of the United States Patent and Trademark Office*